United States Patent
Metzger et al.

(10) Patent No.: US 12,540,991 B2
(45) Date of Patent: Feb. 3, 2026

(54) STATIC AND DYNAMIC NON-LOCALIZED EFFICIENCY RADIO FREQUENCY SHIMMING FOR PARALLEL TRANSMISSION IN MAGNETIC RESONANCE IMAGING

(71) Applicant: Regents of the University of Minnesota, Minneapolis, MN (US)

(72) Inventors: Gregory J. Metzger, Minneapolis, MN (US); Xiaoxuan He, Minneapolis, MN (US); Simon Schmidt, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 119 days.

(21) Appl. No.: 18/225,556

(22) Filed: Jul. 24, 2023

(65) Prior Publication Data

US 2024/0027556 A1    Jan. 25, 2024

Related U.S. Application Data

(60) Provisional application No. 63/369,119, filed on Jul. 22, 2022.

(51) Int. Cl.
   *G01V 3/00*  (2006.01)
   *G01R 33/48*  (2006.01)
   (Continued)

(52) U.S. Cl.
   CPC ....... *G01R 33/543* (2013.01); *G01R 33/4818* (2013.01); *G01R 33/5608* (2013.01)

(58) Field of Classification Search
   CPC ............ G01R 33/3607; G01R 33/5608; G06T 11/005; G06T 11/006; G06T 2211/424
   (Continued)

(56) References Cited

U.S. PATENT DOCUMENTS

| 2015/0309132 A1 | 10/2015 | Brown et al. |
| 2016/0171670 A1* | 6/2016 | Koehler ............. G01R 33/5608 382/131 |
| 2020/0011953 A1 | 1/2020 | Tomi-Tricot et al. |

FOREIGN PATENT DOCUMENTS

| DE | 102006017439 B3 * | 10/2007 | ........... G01R 33/246 |
| EP | 2461175 A1 * | 6/2012 | ........... G01R 33/385 |

(Continued)

OTHER PUBLICATIONS

JP H1156805 A (Miyoshi) (Year: 1999).*

(Continued)

*Primary Examiner* — Walter L Lindsay, Jr.
*Assistant Examiner* — Frederick Wenderoth
(74) *Attorney, Agent, or Firm* — QUARLES & BRADY LLP

(57) ABSTRACT

A non-localized efficiency shimming technique is used to generate radio frequency (RF) shimming values for imaging with a multi-channel transmit RF coil that minimizes subject-specific imperfections in the transmit magnetic field (B1+) and reduces or eliminates signal dropout in the acquired images, while keeping the coil working in an optimal mode with a high transmit efficiency. The non-localized efficiency shimming can be used for both small and large fields-of-view where a specific ROI does not need to be specified. The static non-localized efficiency shim is advantageous for turbo spin echo (TSE) imaging of smaller anatomical targets, whereas the dynamic non-localized efficiency shim is advantageous for larger fields-of-view, such as in human torsos.

16 Claims, 5 Drawing Sheets

(51) Int. Cl.
*G01R 33/54* (2006.01)
*G01R 33/56* (2006.01)

(58) Field of Classification Search
USPC .......................................................... 324/309
See application file for complete search history.

(56) References Cited

FOREIGN PATENT DOCUMENTS

| GB | 2320579 A | * | 6/1998 | ......... G01R 33/4625 |
|---|---|---|---|---|
| WO | WO-2011107951 A1 | * | 9/2011 | ............... H04S 3/02 |
| WO | WO-2014116986 A1 | * | 7/2014 | ........... A61B 5/0042 |

OTHER PUBLICATIONS

Adriany, Gregor, et al. "Transmit and receive transmission line arrays for 7 Tesla parallel imaging." Magnetic Resonance in Medicine: An Official Journal of the International Society for Magnetic Resonance in Medicine 53.2 (2005): 434-445.
Adriany, Gregor, et al. "A geometrically adjustable 16-channel transmit/receive transmission line array for improved RF efficiency and parallel imaging performance at 7 Tesla." Magnetic Resonance in Medicine: An Official Journal of the International Society for Magnetic Resonance in Medicine 59.3 (2008): 590-597.
Aigner, Christoph Stefan, et al. "Calibration-free pTx of the human heart at 7T via 3D universal pulses." Magnetic resonance in medicine 87.1 (2022): 70-84.
Brunheim, Sascha, et al. "Fast and accurate multi-channel B1+ mapping based on the TIAMO technique for 7T UHF body MRI." Magnetic resonance in medicine 79.5 (2018): 2652-2664.
Chung, Sohae, et al. "Rapid B1+ mapping using a preconditioning RF pulse with TurboFLASH readout." Magnetic resonance in medicine 64.2 (2010): 439-446.
Cloos, M. A., et al. "KT-points: short three-dimensional tailored RF pulses for flip-angle homogenization over an extended volume." Magnetic resonance in medicine 67.1 (2012): 72-80.
Dietrich, Sebastian, et al. "3D free-breathing multichannel absolute mapping in the human body at 7T." Magnetic resonance in medicine 85.5 (2021): 2552-2567.
Eichfelder, Gabriele, and Matthias Gebhardt. "Local specific absorption rate control for parallel transmission by virtual observation points." Magnetic resonance in medicine 66.5 (2011): 1468-1476.

Gras, V, Vignaud, A, Amadon, A, Le Bihan, D, Boulant, N (2017), Universal pulses: A new concept for calibra on-free parallel transmission. Magn. Reson. Med., 77: 635-643.
Grissom, William, et al. "Spatial domain method for the design of RF pulses in multicoil parallel excitation." Magnetic Resonance in Medicine: An Official Journal of the International Society for Magnetic Resonance in Medicine 56.3 (2006): 620-629.
He, Xiaoxuan, et al. "Improved TSE imaging at ultrahigh field using nonlocalized efficiency RF shimming and acquisition modes optimized for refocused echoes (AMORE)." Magnetic resonance in medicine 88.4 (2022): 1702-1719.
Katscher, Ulrich, et al. "Transmit sense." Magnetic Resonance in Medicine: An Official Journal of the International Society for Magnetic Resonance in Medicine 49.1 (2003): 144-150.
Liebert, Andrzej, et al. "Multiple interleaved mode saturation (MIMOSA) for B1+ inhomogeneity mitigation in chemical exchange saturation transfer." Magnetic resonance in medicine 82.2 (2019): 693-705.
Malik, Shaihan J., et al. "Tailored excitation in 3D with spiral nonselective (SPINS) RF pulses." Magnetic resonance in medicine 67.5 (2012): 1303-1315.
Mao W, Smith MB, Collins CM. Exploring the limits of RF shimming for high-field MRI of the human head. Magn Reson Med 2006;56(4):918-922.
Metzger, Gregory J., et al. "Dynamically applied B1+ shimming solutions for non-contrast enhanced renal angiography at 7.0 Tesla." Magnetic resonance in medicine 69.1 (2013): 114-126.
Mooiweer, Ronald, et al. "Universal pulses for homogeneous excitation using single channel coils." Magnetic resonance imaging 92 (2022): 180-186.
Orzada, Stephan, et al. RF excitation using time interleaved acquisition of modes (TIAMO) to address B1 inhomogeneity in high-field MRI. Magn Reson Med 2010;64(2):327-333.
Orzada, Stephan, et al. "Time-interleaved acquisition of modes: an analysis of SAR and image contrast implications." Magn Reson Med 67.4 (2012): 1033-1041.
Saekho S, Yip CY, Noll DC, Boada FE, Stenger VA. Fast-kz three-dimensional tailored radiofrequency pulse for reduced B1 inhomogeneity. Magn Reson Med 2006;55(4):719-724.
Setsompop, K., L. L. Wald, and E. Adalsteinsson. "Reduced-voltage RF shimming for adiabatic pulse design in parallel transmission." Proceedings of the 15th Scientific Meeting, ISMRM. Berlin. 2007, 1 page.
Van de Moortele, Pierre-François, et al. "B1 destructive interferences and spatial phase patterns at 7 T with a head transceiver array coil." Magnetic resonance in medicine 54.6 (2005): 1503-1518.

* cited by examiner

STATIC AND DYNAMIC NON-LOCALIZED EFFICIENCY RADIO FREQUENCY SHIMMING FOR PARALLEL TRANSMISSION IN MAGNETIC RESONANCE IMAGING

CROSS-REFERENCE TO RELATED APPLICATIONS

This application claims the benefit of U.S. Provisional Patent Application Ser. No. 63/369,119, filed on Jul. 22, 2022, and entitled "STATIC AND DYNAMIC NON-LOCALIZED EFFICIENCY RADIO FREQUENCY SHIMMING FOR PARALLEL TRANSMISSION IN MAGNETIC RESONANCE IMAGING," which is herein incorporated by reference in its entirety.

STATEMENT OF FEDERALLY SPONSORED RESEARCH

This invention was made with government support under EB029985 and EB027061 awarded by the National Institutes of Health. The government has certain rights in the invention.

BACKGROUND

In recent years, interest in ultra-high field ("UHF") magnetic resonance imaging ("Mill") has grown due to advantages in signal-to-noise ratio ("SNR") and contrast The challenge of transmit B1 (B1+) inhomogeneity at UHF can be addressed through both parallel transmission ("pTx") hardware and radio frequency ("RF") management methods. At UHF, the default circularly polarized ("CP") mode with pTx is typically referred to as a fixed phase distribution across transmit elements typically defined by their azimuthal positions in the RF coil array. Although a variety of strategies have been introduced to homogenize B1+ field, such as spoke pulses, k-T pulses, and multi-dimensional tailored pulses, RF shimming remains the most generally applicable approach given its relative simplicity with respect to sequence-specific modifications and required hardware.

The issues of RF inhomogeneity and limitations in RF transmit power increase with the size of the region-of-interest ("ROI"). Therefore, an inherent tradeoff exists in RF shimming between transmit efficiency and homogeneity. For brain and knee imaging, it is easier to achieve a more homogeneous shim with sufficient B1+ and acceptable specific absorption rate ("SAR") given the relatively small size and volume of the ROIs. For body imaging, however, RF shimming is more challenging because the anatomy-of-interest is increasingly large compared to the RF wavelength, and also because of the inherent limitations in peak B1+ due to larger volumes being excited by the transmit coils. Even a homogeneity shim may still produce undesirable B1+ nulls in the torso, not to mention the relatively low transmit efficiency. While an efficiency shim localized to an anatomical target-of-interest improves B1+, it usually results in image non-uniformity outside of the ROI as compared to those acquired at standard clinical field strength.

The foregoing issues are even more pronounced in spin echo sequences, such as turbo spin-echo ("TSE") or fast spin echo ("FSE") based acquisitions, in the body due to increased sensitivity to low B1+ fields compared to gradient-recalled echo ("GRE") acquisitions. As a result, neither an efficiency nor a homogeneity RF shim can produce a uniform image with an optimal spin-echo contrast. A localized efficiency shim often introduces more pronounced B1+ nulls outside the ROI (or even inside the ROI as it increases in size) while the homogeneity shim significantly increases SAR and possibly compromises contrast if limited by achievable B1+. To facilitate UHF body imaging in a clinically feasible routine with the image uniformity comparable to 3T, a more capable B1+ management technique that optimizes for both efficiency and homogeneity is needed, especially for clinically relevant TSE acquisitions.

Methods to address competing RF shimming needs within a sequence have been previously introduced either through dynamically applying different RF pulse tailored shims within a repetition time ("TR") or through the time interleaved acquisition of modes ("TIAMO"), where different RF shims or modes are employed across TRs. In TIAMO, alternating complementary transmit modes between subsequent TRs can help mitigate the B1+ inefficiencies in either individual mode. Treating each mode as a virtual set of receive channels, a combined image can be obtained with improved uniformity at a mild cost of SNR and acquisition efficiency by undersampling each mode and using a GRAPPA reconstruction.

While "standard" modes in TIAMO, defined as CP and CP2+, often work well especially for low flip angle GRE acquisitions, optimization of modes is possible. In terms of cost functions, a unity of B1+ in the root sum of squares of the modes can maintain T1-weighted contrast in spoiled gradient echo images. However, this cost function leads to a suboptimal transmit efficiency, especially impactful in TSE acquisitions, given that the solution space contains regions where neither of the modes provides the desired flip angle unless with a higher transmit power. It becomes even more problematic for TSE imaging with a larger FOV, such as in the body, where B1+ inhomogeneity is more pronounced and peak available B1+ is limited, resulting in degraded contrast and even signal dropout in areas where under-flipping occurs. Therefore, a more efficient mode design that maintains contrast for T2 and proton density ("PD") weighted TSE acquisitions is still needed.

SUMMARY OF THE DISCLOSURE

The present disclosure addresses the aforementioned drawbacks by providing a method for generating radio frequency (RF) shimming values for use with a magnetic resonance imaging (MM) system. The method includes accessing RF transmit sensitivity profile data with a computer system. RF shimming values are generated with the computer system by inputting the RF transmit sensitivity profile data to a non-localized efficiency shimming cost function that penalizes under-flipping based on a minimum flip angle tuning parameter. Optimizing the non-localized efficiency shimming cost function generates an output as the RF shimming values, where the RF shimming values minimize destructive B1+ interferences within an entire imaging field-of-view. The RF shimming values are then stored for use with an MM system.

The foregoing and other aspects and advantages of the present disclosure will appear from the following description. In the description, reference is made to the accompanying drawings that form a part hereof, and in which there is shown by way of illustration one or more embodiments. These embodiments do not necessarily represent the full scope of the invention, however, and reference is therefore made to the claims and herein for interpreting the scope of the invention.

DETAILED DESCRIPTION

Figure 1:
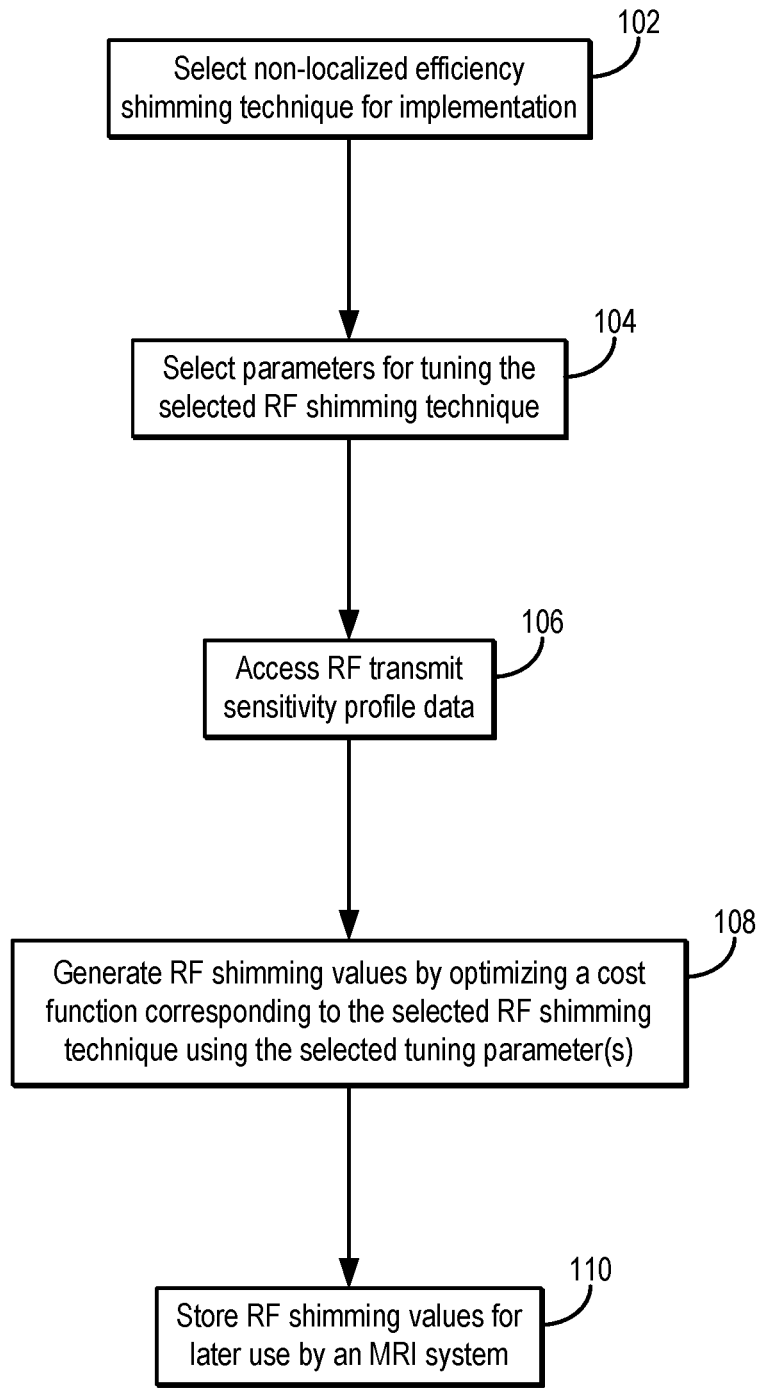
FIG. 1 is a flowchart of an example method for generating RF shimming values using a non-localized efficiency static and/or dynamic shimming technique, such as a non-localized TIAMO or AMORE technique.

Described here are systems and methods for shimming a transmit radio frequency ("RF") field in connection with magnetic resonance imaging ("MIII"). The disclosed systems and methods implement an RF shimming algorithm for imaging with a multi-channel transmit RF coil that minimizes subject-specific imperfections in the transmit magnetic field (B1+) and reduces or eliminates signal dropout in the acquired images, while keeping the coil working in an optimal mode with a high transmit efficiency. As a result, the disclosed systems and methods are capable of achieving greater image uniformity and lower SAR, even for spin echo-based pulse sequences, such as turbo spin echo ("TSE") or fast spin-echo ("FSE") based acquisitions, among others.

Existing radio-frequency shimming algorithms struggle to balance efficiency and non-uniformity especially dropout in the transmit magnetic field produced by a multi-channel radiofrequency coil except for a small local region ("localized") in the imaging field-of-view ("FOV"). The disclosed non-localized efficiency shimming approach significantly reduces such non-uniformity and dropout with little to no cost in the transmit efficiency in the full imaging FOV for in-vivo MRI. In addition, the disclosed systems and methods can generate both phase-only and phase-magnitude solutions for both static (single) and dynamic (multiple) shimming mode In general, the systems and methods described in the present disclosure make use of a non-localized efficiency shim combined with an adapted time interleaved acquisition of modes ("TIAMO") design strategy, which can be referred to as Acquisition Modes Optimized for Refocused Echoes ("AMORE"). Because the disclosed AMORE technique is non-localized, it can be used for both small and large FOVs because a specific ROI does not need to be specified. As such, AMORE can be used to provide RF shimming for larger anatomical volumes, such as the interior torso, in addition to smaller anatomical volumes, such as the brain and knee. The non-localized efficiency shim by itself is advantageous for TSE imaging of smaller anatomical targets such as the brain and knee, while AMORE provides optimized modes for TIAMO acquisitions improving TSE imaging performance in the torso by increasing B1+ efficiency.

A brief review of efficiency cost functions in RF shimming and how they can be incorporated into the disclosed TIAMO mode design is provided. In the following context, an RF shim can be referred to as a "mode." The calculation of TIAMO modes can be performed by calculating multiple RF shims with specific imposed constraints.

The goal of localized efficiency shimming is to improve B1+ transmit efficiency (i.e., $B1+/W^{0.5}$) within a typically small ROI (e.g., prostate or single-voxel spectroscopy volume) and to subsequently reduce total power deposition. Previous approaches have introduced different metrics or cost functions to improve transmit efficiency within an ROI, such as the sum of magnitude over magnitude of sum of all transmit channels. Alternatively, it has been shown that localized transmit efficiency 17R can be analytically defined as the Rayleigh quotient:

$$\eta_R = \frac{x^H S_R^H S_R x}{x^H x}; \qquad (1)$$

where x is an $N_c \times 1$ complex vector representing shim values of a total of $N_c$ transmit channels, $S_R$ is an $N_s \times N_c$ matrix of transmit sensitivities of $N_c$ transmit channels within the specified ROI containing $N_s$ voxels. Note that $S_R$ is typically a subset of the transmit sensitivities in the full FOV that contains a total of N voxels (i.e., $N > N_S$), denoted as an $N \times N_c$ matrix, S. The above quotient represents the total B1+ achievable within the ROI given normalized total input power and reaches an analytical maximum, $\eta_{max}$, as given by the largest eigenvalue of the Hermitian matrix, $S_R^H S_R$, where the corresponding eigenvector is the analytical maximum efficiency shim. In practice, such a shim may not be feasible due to hardware limitations, such as per-channel power limits or a preference for a phase-only RF shim. However, it can be used as a reasonable initial guess for optimization and can serve as a quantitative metric of transmit efficiency, or as an optimization constraint.

For non-localized efficiency shimming, the goal is to improve B1+ within the entire imaging FOV rather than a local ROI. Although the Rayleigh quotient can still be used, the resulting shim would likely produce more pronounced B1+ inhomogeneities and undesirable B1+ nulls, especially with increasing target size. Such an issue arises from the fact that voxels closer to coil elements typically have a higher B1+ and are, therefore, weighted more in the Rayleigh quotient, unless additional constraints (e.g., a specified minimum B1+) are imposed. That is, the Rayleigh quotient as a cost function maximizes the total B1+ within a given region, which is not necessarily equivalent to minimizing B1+ destructive interferences. To produce a shim that is efficient in the sense that destructive B1+ interferences are minimized within the entire imaging FOV, the systems and methods described in the present disclosure implement a more appropriate cost function for non-localized efficiency shimming that penalizes under-flipping alone without explicitly constraining over-flipping:

$$f(x) = \sum_{i=1}^{N} \frac{r(|s_i x|)^H r(|s_i x|)}{x^H x}; \qquad (2)$$

where the voxel-wise cost function is evaluated by a piecewise linear function:

$$r(\alpha) = \begin{cases} \alpha_{min} - \alpha, & \alpha < \alpha_{min} \\ 0, & \alpha \geq \alpha_{min} \end{cases}; \quad (3)$$

where $s_i$ are the row vectors in S; $\alpha=|s_i x|$ is the magnitude of voxel-wise B1+ under the given shim, x; and $\alpha_{min}$ is the threshold for minimum B1+ to be used during optimization. By penalizing only voxels with under-flipping, this above cost function can produce solutions that are efficient in the sense that B1+ nulls are minimized within the entire imaging FOV without explicitly constraining over-flipping.

While different B1+ modes in TIAMO are treated as virtual receive channels during reconstruction, a significant distinction from physical receive channels is that the underlying magnetization is impacted by the modes, thereby influencing image contrast in addition to SNR. To date, TIAMO has been described using the small tip angle approximation and later optimized for T1 weighted GRE acquisitions. It is an aspect of the present disclosure that TIAMO can be adapted to allow for multiple modes to be optimized to maintain contrast in TSE acquisitions (as described in the attached appendix). For PD or T2 weighted TSE, at least one of the modes is selected to achieve the target flip angle in order to produce the desired contrast in the final reconstructed images. To generate modes appropriate for maintaining performance (i.e., contrast and SNR) for TSE imaging, the non-localized efficiency shimming cost function is extended to include multiple transmit modes while constraining at least one of the modes to achieve the nominal flip angle. Thus, the following AMORE cost function can be implemented:

$$f(x) = \sum_{i=1}^{N} \frac{r(\alpha_M)^H r(\alpha_M)}{x_M^H x_M}; \quad (4)$$

where $$\alpha_M = \max_{m \in \{1,2,\dots,N_m\}} |s_i x_m|$$

is the voxel-wise maximum flip angle across a total of $N_m$ transmit modes. In cases where a tradeoff between efficiency and homogeneity is desired, the voxel-wise cost function can be adapted to:

$$r(\alpha) = \begin{cases} \alpha_{min} - \alpha, & \alpha < \alpha_{min} \\ 0, & \alpha_{min} \leq \alpha \leq \alpha_{max} \\ \alpha - \alpha_{max}, & \alpha > \alpha_{max} \end{cases}; \quad (5)$$

where $\alpha_{min}$ and $\alpha_{max}$ are the tunning parameters for the tolerance levels of B1+ inhomogeneities.

In some embodiments, the option for a localized implementation of TIAMO and/or AMORE that incorporates an efficiency constraint within a specified local ROI can be used. This alternative implementation can be advantageous for TSE imaging in the body where the peak B1+ is often a limiting factor and when there is a local ROI where optimal SNR and contrast is desired. In the following context, this implementation can be referred to as "localized" to differentiate from non-localized TIAMO.

In addition to minimizing the cost functions, as is the case with non-localized TIAMO, the design of localized TIAMO imposes an additional constraint on the first mode to satisfy $\eta_R \geq Q \cdot \eta_{max}$, as characterized by Eqn. (1), where $0<Q<1$ is a specified efficiency quality factor evaluated within the ROI. With appropriate solvers this allows a tradeoff between the minimum transmit efficiency in a local ROI and mode complementariness. Additional constraints can also be incorporated into the design such as local SAR constraints when a set of virtual observation points ("VOP") is defined for a given coil. The shim or mode solutions correspond to the minima of the cost functions in Eqns. (2) and/or (4). Dependent on whether constraints are imposed or not, mode optimization can be a constrained or unconstrained non-linear minimization problem, which can be solved by a variety of algorithms such as interior-point method (constrained) or quasi-newton method (unconstrained).

The choice of $\alpha_{min}$ can be implemented as a tuning parameter in the sequence user interface, where its value can be determined by a user-specified percentile of the default CP mode B1+ distribution. As a non-limiting example, $\alpha_{min}$ can be set to 50th percentile for non-localized efficiency shimming in smaller anatomies and 75th percentile for non-localized AMORE design in larger anatomies. Regarding the local minima problems in Eqns. (2) and (4), phase-only optimizations converge well with a default CP mode as the initial guess and produce a CP-like shim with significantly reduced B1+ nulls. For phase-magnitude optimizations, a two-step approach can be implemented; for instance, solving initially with a phase-only optimization followed by a phase-magnitude optimization. In the latter case, the number of variables to solve doubles and may require bounds to avoid exceeding per-channel power limits resulting from either hardware or safety constraints.

In some examples, universal models may be used to apply a universal pulse concept to TIAMO and AMORE implementations. Ultrahigh-field MRI often faces challenges of inhomogeneity of the transmit B1+ field due to decreased RF wavelengths at ultrahigh field strengths (e.g., 10.5 T). The systems and methods described in the present disclosure can overcome these challenges. In one example, this can be achieved using universal modes, which result from the application of universal pulse concepts to TIAMO and AMORE to address B1+ inhomogeneity.

As a non-limiting example, subject-specific B1+ maps are generated or otherwise accessed. Following a non-localized TIAMO design, subject-specific solutions may be calculated according to the following minimization problem:

$$\min_{x_1, x_2, \dots, x_{N_m}} \left\{ \left\| \sqrt{\sum_{m=1}^{N_m} |S \cdot x_m|^2} - |\alpha| \right\|^2 \right\}; \quad (6)$$

where $x_m$ is the $N_c \times 1$ complex shimming vector (e.g., phase and magnitude) of mode m with a total of $N_c$ transmit channels, S is a $N_s \times N_c$ matrix of transmit sensitivities within a slice containing $N_s$ voxels, and $\alpha$ is the target B1+ distribution.

To generate universal modes, the optimization in Eqn. (6) may be extended to include transmit sensitivities from multiple subjects by minimizing the Euclidian norm of the objective function across different subjects. Additionally or alternatively, the cost functions described above can also be adapted to include transmit sensitivities from multiple subjects in order to generate universal modes.

Subject-specific as well as universal modes may be computed for a different number of modes of up to $N_m=5$, as an example, with spatially uniform target B1+. Additionally or alternatively, $N_m$ default modes may be defined as shimming vectors with constant amplitude and a phase increment (e.g., a phase increment of m·22.5 degrees for the mth mode). Using a leave-one-subject-out approach, universal modes may be calculated for all permutations of a number (e.g., 5) subject-specific B1+ maps and consecutively applied to the unseen subject. While the subject-specific solutions when applied to the subject for whom they were optimized are inherently power-calibrated, this may not be true when applying them to other subjects. Therefore, in these cases, a simple power-calibration may be performed to match the average B1+ to the target value. The same power-calibration may be performed for the default modes and the universal modes. Using this approach, the universal pulse concept can be applied to TIAMO, which demonstrates the feasibility of using universal modes to mitigate B1+ inhomogeneities.

Referring now to FIG. 1, a flowchart is illustrated as setting forth the steps of an example method for determining RF shimming values in accordance with some embodiments described in the present disclosure.

First, a user selects which RF shimming technique to utilize, as indicated at step 102. For instance, a user can select via a computer system (e.g., an operator workstation of an MM system) whether a localized TIAMO, non-localized TIAMO, and/or AMORE shimming technique should be implemented.

After the shimming technique is selected, the user may also select various parameters to be used, as indicated at step 104. Depending on the shimming technique selected by the user, these parameters may include a minimum flip angle threshold, $\alpha_{min}$, a maximum flip angle threshold, $\alpha_{max}$, the number of modes, $N_m$, the types of modes (e.g., default, universal), and so on. The parameters can be selected by the user via a computer system (e.g., an operator workstation of an Mill system). In some embodiments, one or more constraints can also be selected by the user. For instance, a constraint for a desired efficiency in a specified local ROI using the Rayleigh quotient can be selected. Additionally or alternatively, a local SAR constraint based on VOPs can be selected to improve SAR efficiency.

RF transmit sensitivity profile data are then accessed with a computer system (e.g., the operator workstation of the Mill system), as indicated at step 106. As a non-limiting example, the RF transmit sensitivity profile data may include B1+ maps. These sensitivity profile data may be coil/channel specific, mode specific, or both. In some implementations, the RF transmit sensitivity data may include RF transmit sensitivity profiles for a plurality of different subjects.

Using the RF transmit sensitivity profile data and selected parameters, RF shimming values are determined using the selected RF shimming technique, as indicated at step 108. In general, determining the RF shimming values includes optimizing a cost function corresponding to the selected RF shimming technique. For instance, the RF shimming values can be determined by optimizing the cost function in Eqn. (2) and/or Eqn. (4). Additionally or alternatively, the cost function in Eqn. (6) may be optimized to generate universal modes. In these instances, a plurality of cost functions are constructed (e.g., a different cost function for each of a plurality of subjects for whom RF transmit sensitivity data have been provided) and optimized by minimizing a Euclidian norm across the subjects.

The determined RF shimming values are then stored for later use, as indicated at step 110. The RF shimming values can then be accessed by an MM system to be utilized in an imaging session to acquire data from a subject. As a non-limiting example, the RF shimming values can be accessed by an MM system and utilized in a TSE-based data acquisition in order to acquire k-space data from which images with improved image uniformity can be reconstructed. As a non-limiting example, TIAMO can be implemented in a TSE pulse sequence by adding an outer loop over all k-space lines and/or echo trains in one TR. The modes can be calculated online (e.g., by a custom plugin interfaced to the sequence). The optimization problem can be solved by using the interior point method. Per-channel B1+ maps needed for mode optimization can be acquired using the default product sequence known as pre-saturated turbo-FLASH.

Disclosed here are systems and methods for RF shimming that implement a cost function for non-localized efficiency shimming, which can be extended to AMORE to improve TSE acquisitions at UHF. The proposed cost functions underlying this approach address the observation that the contrast in TSE images can be impacted to a greater extent by under-flipping than over-flipping. By itself, the non-localized efficiency shimming has been demonstrated to reduce signal dropout in smaller anatomies and, when used in AMORE, helped reduce signal dropout and maintain contrast in TSE acquisitions in larger targets by minimizing areas with low B1+. Phase-only modes can be used in different anatomies with increased transmit efficiency, which is important when peak power and SAR are limiting factors. Given that the per-channel power limit is still widely used for local SAR supervision at UHF, these proposed approaches can provide simple and effective phase-only solutions to manage B1+ inhomogeneities as well as maintain protocol consistency across subjects.

In contrast to other RF management methods such as spoke pulses and dynamic pTx pulses, TIAMO does not require gradient optimization since signals from different modes do not directly interfere with each other and are therefore phase insensitive. This makes it easier to incorporate TIAMO into more sequences whereas increasing pulse durations when using spoke or tailored pTx pulses might become an issue. Even though body imaging at UHF especially TSE imaging is generally challenging due to limitations in peak B1+ and subject-specific inhomogeneities, it is an advantage of the present disclosure that the B1+ shading and nulls in the torso can be effectively reduced by designing two phase-only modes with AMORE. Given the similarities in the image quality when using the localized and non-localized AMORE designs, the latter appears to be a promising and clinically feasible solution to torso imaging at 7T that also helps simplify the pTx workflow by reducing the need to define a local target while improving overall imaging quality.

The systems and methods described in the present disclosure have been demonstrated as improving TSE images in multiple anatomies when using the proposed non-localized efficiency shimming and its extension AMORE at UHF. Observed improvements included reduced signal dropout and higher transmit B1+ efficiency when compared to previously proposed approaches. The non-localized efficiency shimming is a simple and robust approach to improve image uniformity in smaller targets such as brain and knee, whereas AMORE may serve as a clinically feasible routine for TSE acquisition for larger FOVs such as the human torso.

Figure 2:
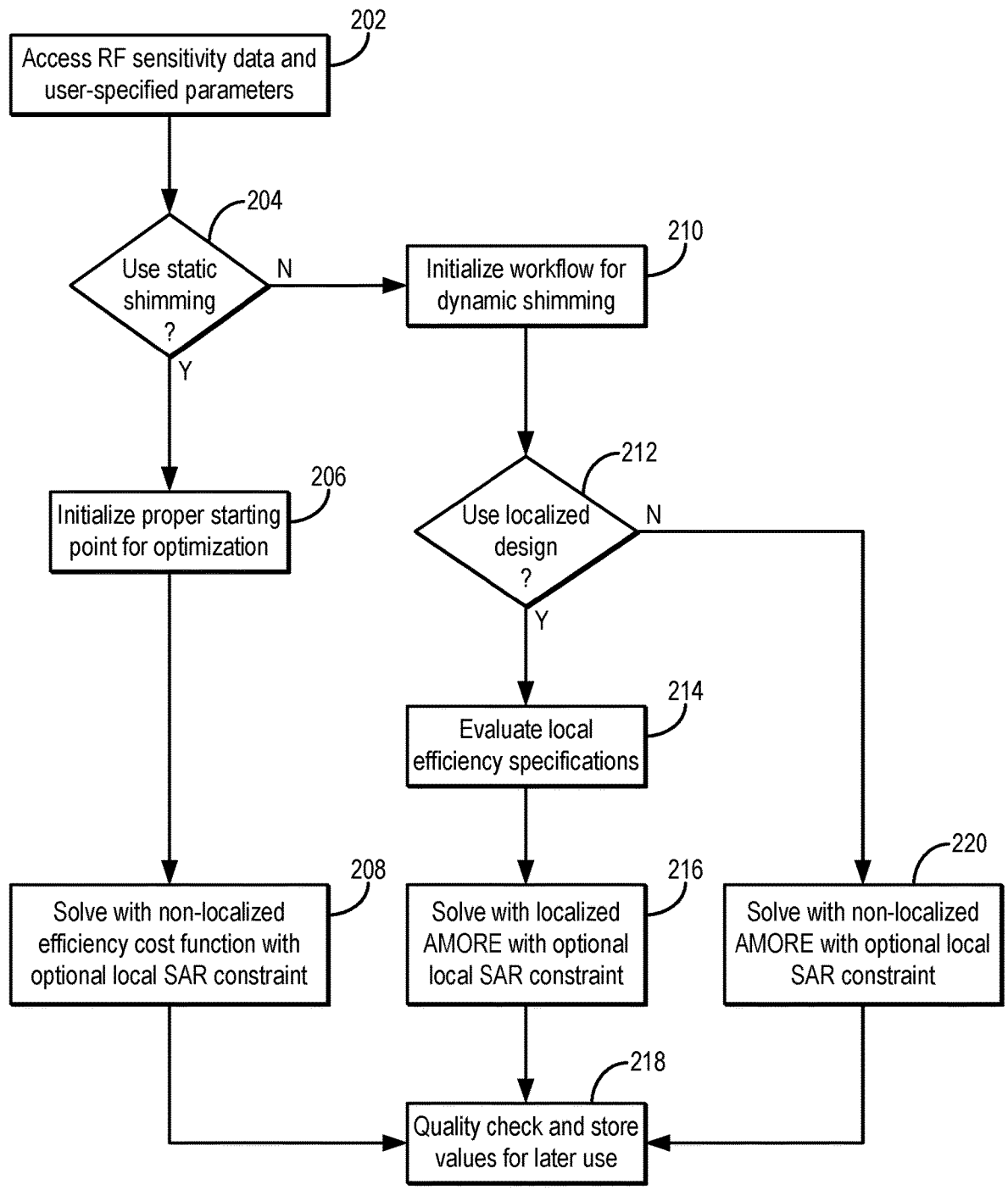
FIG. 2 is a block diagram of an example workflow to generate non-localized efficiency static and dynamic shimming values based on the operator's prescription of the desired method, which may be implemented as a part of the method of FIG. 1.

Referring now to FIG. 2, an example is illustrated, in which steps to generate non-localized efficiency static and dynamic shimming values as described above are shown. The workflow takes RF transmit sensitivity data along with operator's prescriptions as the input in step 202. Based on the prescription details, the use of either static or dynamic non-localized efficiency shimming will be determined in step 204.

For the static shimming, an initialization step 206 is performed to prepare the upcoming optimization with an initial guess of the parameters. The initial guess may be based on empirical values, additional calculation steps, or combinations thereof. The shim values are then computed by minimizing the non-localized efficiency cost function with an optional local SAR constraint as shown in step 208. A quality check can be performed and the verified shim values stored for later use on an MRI system as shown in step 218.

For dynamic shimming, an initialization step 210 is performed to prepare the upcoming optimization workflow. Based on the operator's prescription, either the localized or non-localized workflow will be initiated in step 212. For the non-localized workflow, the dynamic shim values can be computed by minimizing the AMORE cost function with an optional local SAR constraint as shown in step 220. For the localized workflow, an evaluation process shown in step 214 can be performed to determine the local efficiency specifications to be used. The shim values can be computed by minimizing the AMORE cost function with such specifications and any optional local SAR constraint in step 216. Both non-localized and localized shim values can go through a quality check and get stored for later use as shown in 218.

Figure 3:
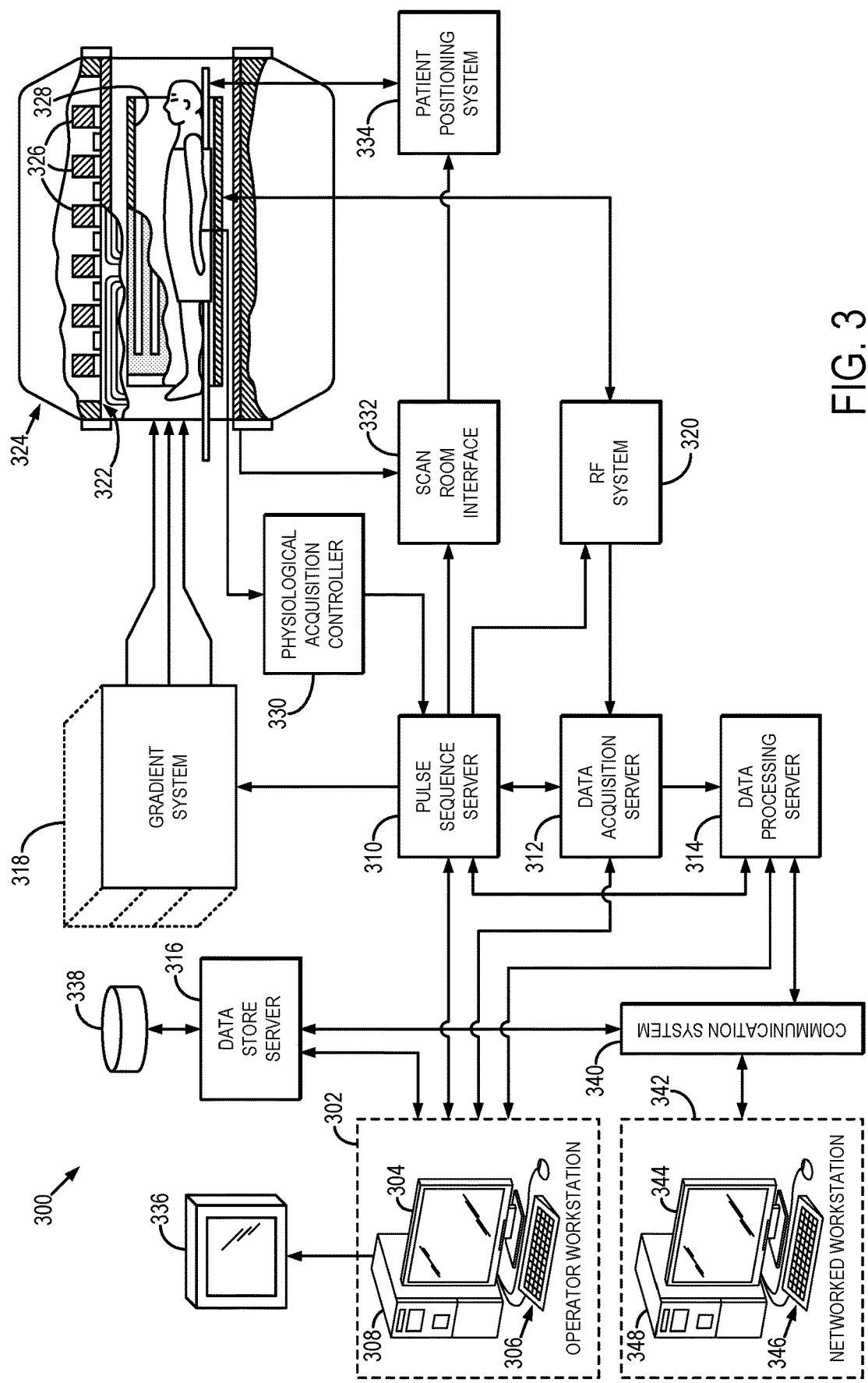
FIG. 3 is a block diagram of an example MRI system that can implement the methods described in the present disclosure.

Referring particularly now to FIG. 3, an example of an MRI system 300 that can implement the methods described here is illustrated. The MRI system 300 includes an operator workstation 302 that may include a display 304, one or more input devices 306 (e.g., a keyboard, a mouse), and a processor 308. The processor 308 may include a commercially available programmable machine running a commercially available operating system. The operator workstation 302 provides an operator interface that facilitates entering scan parameters into the MRI system 300. The operator workstation 302 may be coupled to different servers, including, for example, a pulse sequence server 310, a data acquisition server 312, a data processing server 314, and a data store server 316. The operator workstation 302 and the servers 310, 312, 314, and 316 may be connected via a communication system 340, which may include wired or wireless network connections.

The pulse sequence server 310 functions in response to instructions provided by the operator workstation 302 to operate a gradient system 318 and a radiofrequency ("RF") system 320. Gradient waveforms for performing a prescribed scan are produced and applied to the gradient system 318, which then excites gradient coils in an assembly 322 to produce the magnetic field gradients $G_x$, $G_y$, and $G_z$ that are used for spatially encoding magnetic resonance signals. The gradient coil assembly 322 forms part of a magnet assembly 324 that includes a polarizing magnet 326 and a whole-body RF coil 328.

RF waveforms are applied by the RF system 320 to the RF coil 328, or a separate local coil to perform the prescribed magnetic resonance pulse sequence. Responsive magnetic resonance signals detected by the RF coil 328, or a separate local coil, are received by the RF system 320. The responsive magnetic resonance signals may be amplified, demodulated, filtered, and digitized under direction of commands produced by the pulse sequence server 310. The RF system 320 includes an RF transmitter for producing a wide variety of RF pulses used in MRI pulse sequences. The RF transmitter is responsive to the prescribed scan and direction from the pulse sequence server 310 to produce RF pulses of the desired frequency, phase, and pulse amplitude waveform. The generated RF pulses may be applied to the whole-body RF coil 328 or to one or more local coils or coil arrays.

The RF system 320 also includes one or more RF receiver channels. An RF receiver channel includes an RF preamplifier that amplifies the magnetic resonance signal received by the coil 328 to which it is connected, and a detector that detects and digitizes the I and Q quadrature components of the received magnetic resonance signal. The magnitude of the received magnetic resonance signal may, therefore, be determined at a sampled point by the square root of the sum of the squares of the I and Q components:

$$M=\sqrt{I^2+Q^2};$$

and the phase of the received magnetic resonance signal may also be determined according to the following relationship:

$$\varphi = \tan^{-1}\left(\frac{Q}{I}\right).$$

The pulse sequence server 310 may receive patient data from a physiological acquisition controller 330. By way of example, the physiological acquisition controller 330 may receive signals from a number of different sensors connected to the patient, including electrocardiograph ("ECG") signals from electrodes, or respiratory signals from a respiratory bellows or other respiratory monitoring devices. These signals may be used by the pulse sequence server 310 to synchronize, or "gate," the performance of the scan with the subject's heart beat or respiration.

The pulse sequence server 310 may also connect to a scan room interface circuit 332 that receives signals from various sensors associated with the condition of the patient and the magnet system. Through the scan room interface circuit 332, a patient positioning system 334 can receive commands to move the patient to desired positions during the scan.

The digitized magnetic resonance signal samples produced by the RF system 320 are received by the data acquisition server 312. The data acquisition server 312 operates in response to instructions downloaded from the operator workstation 302 to receive the real-time magnetic resonance data and provide buffer storage, so that data is not lost by data overrun. In some scans, the data acquisition server 312 passes the acquired magnetic resonance data to the data processor server 314. In scans that require information derived from acquired magnetic resonance data to control the further performance of the scan, the data acquisition server 312 may be programmed to produce such information and convey it to the pulse sequence server 310. For example, during pre-scans, magnetic resonance data may be acquired and used to calibrate the pulse sequence performed by the pulse sequence server 310. As another example, navigator signals may be acquired and used to adjust the operating parameters of the RF system 320 or the gradient system 318, or to control the view order in which k-space is sampled. In still another example, the data acquisition server 312 may also process magnetic resonance signals used to detect the arrival of a contrast agent in a magnetic resonance angiography ("MRA") scan. For example, the data acquisition server 312 may acquire magnetic resonance data and processes it in real-time to produce information that is used to control the scan.

The data processing server 314 receives magnetic resonance data from the data acquisition server 312 and processes the magnetic resonance data in accordance with instructions provided by the operator workstation 302. Such processing may include, for example, reconstructing two-dimensional or three-dimensional images by performing a Fourier transformation of raw k-space data, performing other image reconstruction algorithms (e.g., iterative or backprojection reconstruction algorithms), applying filters to raw k-space data or to reconstructed images, generating functional magnetic resonance images, or calculating motion or flow images.

Images reconstructed by the data processing server 314 are conveyed back to the operator workstation 302 for storage. Real-time images may be stored in a data base memory cache, from which they may be output to operator display 302 or a display 336. Batch mode images or selected real time images may be stored in a host database on disc storage 338. When such images have been reconstructed and transferred to storage, the data processing server 314 may notify the data store server 316 on the operator workstation 302. The operator workstation 302 may be used by an operator to archive the images, produce films, or send the images via a network to other facilities.

The Mill system 300 may also include one or more networked workstations 342. For example, a networked workstation 342 may include a display 344, one or more input devices 346 (e.g., a keyboard, a mouse), and a processor 348. The networked workstation 342 may be located within the same facility as the operator workstation 302, or in a different facility, such as a different healthcare institution or clinic.

The networked workstation 342 may gain remote access to the data processing server 314 or data store server 316 via the communication system 340. Accordingly, multiple networked workstations 342 may have access to the data processing server 314 and the data store server 316. In this manner, magnetic resonance data, reconstructed images, or other data may be exchanged between the data processing server 314 or the data store server 316 and the networked workstations 342, such that the data or images may be remotely processed by a networked workstation 342.

Figure 4:
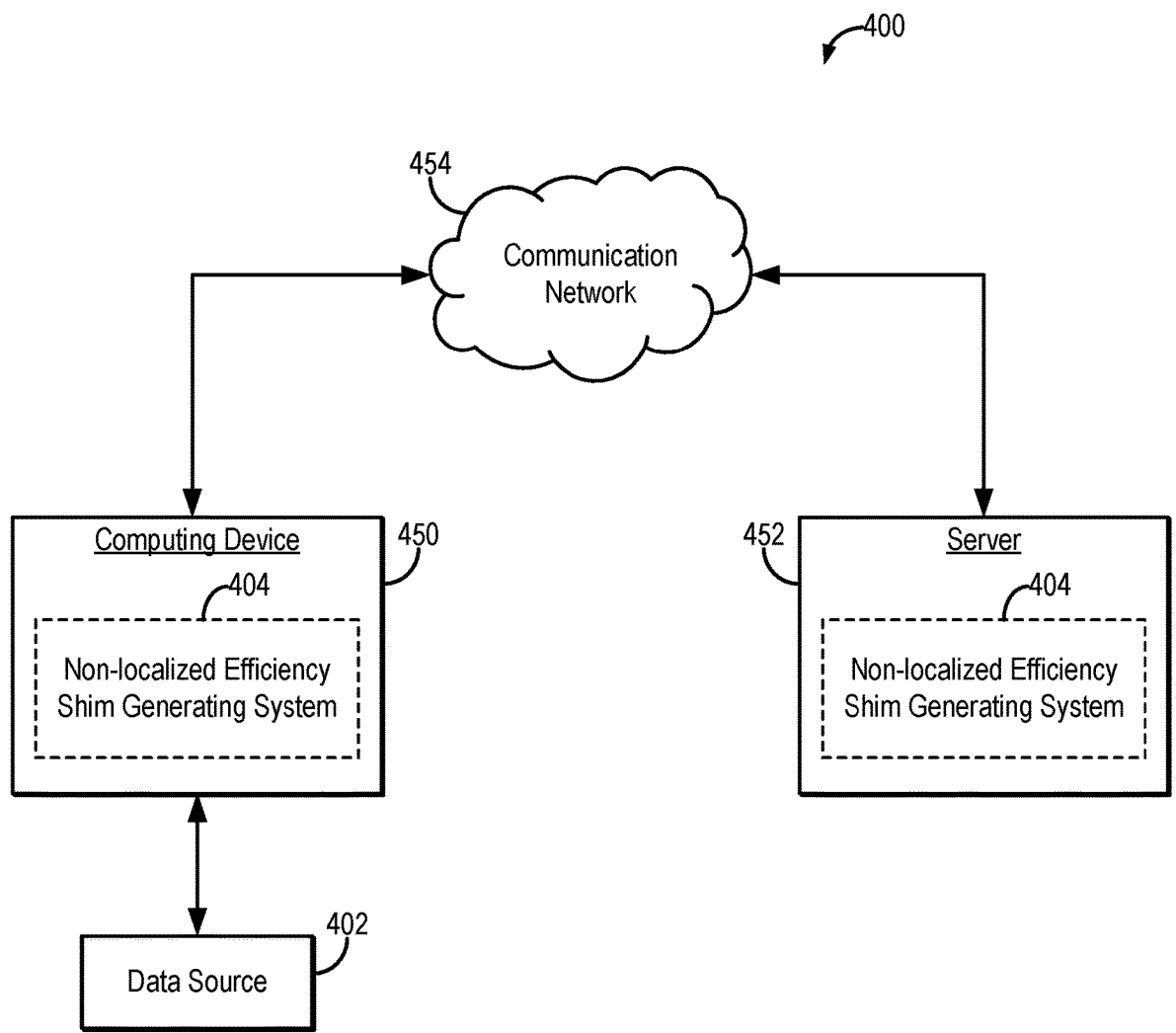
FIG. 4 is a block diagram of an example system for generating RF shimming values using a non-localized efficiency shim technique, which in some implementations may a system separate from an MIII system and in other implementations may be a system that is integrated with an MIII system.

Referring now to FIG. 4, an example of a system 400 for computing, generating, or otherwise determining RF shimming values for an RF transmit coil in accordance with some embodiments of the systems and methods described in the present disclosure is shown. As shown in FIG. 4, a computing device 450 can receive one or more types of data (e.g., RF transmit sensitivity profile data, flip angle threshold data) from data source 402. In some embodiments, computing device 450 can execute at least a portion of a non-localized efficiency shim generating system 404 to compute, generate, or otherwise determine shimming values for an RF transmit coil from data received from the data source 402.

Additionally or alternatively, in some embodiments, the computing device 450 can communicate information about data received from the data source 402 to a server 452 over a communication network 454, which can execute at least a portion of the non-localized efficiency shim generating system 404. In such embodiments, the server 452 can return information to the computing device 450 (and/or any other suitable computing device) indicative of an output of the non-localized efficiency shim generating system 404.

In some embodiments, computing device 450 and/or server 452 can be any suitable computing device or combination of devices, such as a desktop computer, a laptop computer, a smartphone, a tablet computer, a wearable computer, a server computer, a virtual machine being executed by a physical computing device, and so on. The computing device 450 and/or server 452 can also reconstruct images from the data.

In some embodiments, data source 402 can be any suitable source of data (e.g., measurement data, images reconstructed from measurement data, processed image data), such as an MRI system, another computing device (e.g., a server storing measurement data, images reconstructed from measurement data, processed image data), and so on. In some embodiments, data source 402 can be local to computing device 450. For example, data source 402 can be incorporated with computing device 450 (e.g., computing device 450 can be configured as part of a device for measuring, recording, estimating, acquiring, or otherwise collecting or storing data). As another example, data source 402 can be connected to computing device 450 by a cable, a direct wireless link, and so on. Additionally or alternatively, in some embodiments, data source 402 can be located locally and/or remotely from computing device 450, and can communicate data to computing device 450 (and/or server 452) via a communication network (e.g., communication network 454).

In some embodiments, communication network 454 can be any suitable communication network or combination of communication networks. For example, communication network 454 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), other types of wireless network, a wired network, and so on. In some embodiments, communication network 454 can be a local area network, a wide area network, a public network (e.g., the Internet), a private or semi-private network (e.g., a corporate or university intranet), any other suitable type of network, or any suitable combination of networks. Communications links shown in FIG. 4 can each be any suitable communications link or combination of communications links, such as wired links, fiber optic links, Wi-Fi links, Bluetooth links, cellular links, and so on.

Figure 5:
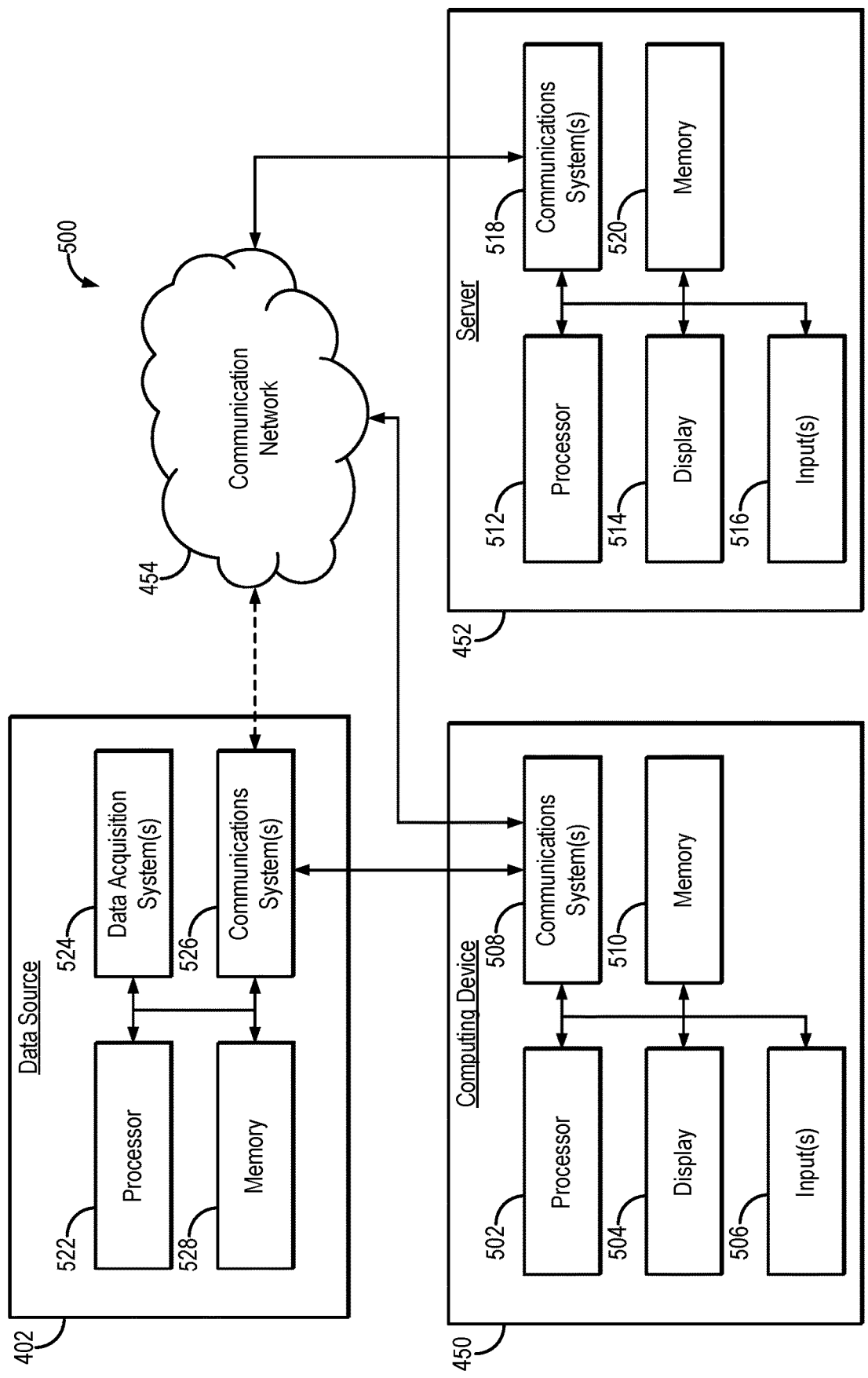
FIG. 5 is a block diagram of example components that can implement some embodiments of the system of FIG. 4.

Referring now to FIG. 5, an example of hardware 500 that can be used to implement data source 402, computing device 450, and server 452 in accordance with some embodiments of the systems and methods described in the present disclosure is shown.

As shown in FIG. 5, in some embodiments, computing device 450 can include a processor 502, a display 504, one or more inputs 506, one or more communication systems 508, and/or memory 510. In some embodiments, processor 502 can be any suitable hardware processor or combination of processors, such as a central processing unit ("CPU"), a graphics processing unit ("GPU"), and so on. In some embodiments, display 504 can include any suitable display devices, such as a liquid crystal display ("LCD") screen, a light-emitting diode ("LED") display, an organic LED ("OLED") display, an electrophoretic display (e.g., an "e-ink" display), a computer monitor, a touchscreen, a television, and so on. In some embodiments, inputs 506 can include any suitable input devices and/or sensors that can be used to receive user input, such as a keyboard, a mouse, a touchscreen, a microphone, and so on.

In some embodiments, communications systems 508 can include any suitable hardware, firmware, and/or software for communicating information over communication network 454 and/or any other suitable communication networks. For example, communications systems 508 can include one or more transceivers, one or more communication chips and/or chip sets, and so on. In a more particular example, communications systems 508 can include hardware, firmware, and/or software that can be used to establish a Wi-Fi connection, a Bluetooth connection, a cellular connection, an Ethernet connection, and so on.

In some embodiments, memory 510 can include any suitable storage device or devices that can be used to store instructions, values, data, or the like, that can be used, for example, by processor 502 to present content using display 504, to communicate with server 452 via communications system(s) 508, and so on. Memory 510 can include any suitable volatile memory, non-volatile memory, storage, or any suitable combination thereof. For example, memory 510 can include random-access memory ("RAM"), read-only memory ("ROM"), electrically programmable ROM ("EPROM"), electrically erasable ROM ("EEPROM"), other forms of volatile memory, other forms of non-volatile memory, one or more forms of semi-volatile memory, one or more flash drives, one or more hard disks, one or more solid state drives, one or more optical drives, and so on. In some embodiments, memory 510 can have encoded thereon, or otherwise stored therein, a computer program for controlling operation of computing device 450. In such embodiments, processor 502 can execute at least a portion of the computer program to present content (e.g., images, user interfaces, graphics, tables), receive content from server 452, transmit information to server 452, and so on. For example, the processor 502 and the memory 510 can be configured to perform the methods described herein (e.g., the method of FIG. 1).

In some embodiments, server 452 can include a processor 512, a display 514, one or more inputs 516, one or more communications systems 518, and/or memory 520. In some embodiments, processor 512 can be any suitable hardware processor or combination of processors, such as a CPU, a GPU, and so on. In some embodiments, display 514 can include any suitable display devices, such as an LCD screen, LED display, OLED display, electrophoretic display, a computer monitor, a touchscreen, a television, and so on. In some embodiments, inputs 516 can include any suitable input devices and/or sensors that can be used to receive user input, such as a keyboard, a mouse, a touchscreen, a microphone, and so on.

In some embodiments, communications systems 518 can include any suitable hardware, firmware, and/or software for communicating information over communication network 454 and/or any other suitable communication networks. For example, communications systems 518 can include one or more transceivers, one or more communication chips and/or chip sets, and so on. In a more particular example, communications systems 518 can include hardware, firmware, and/or software that can be used to establish a Wi-Fi connection, a Bluetooth connection, a cellular connection, an Ethernet connection, and so on.

In some embodiments, memory 520 can include any suitable storage device or devices that can be used to store instructions, values, data, or the like, that can be used, for example, by processor 512 to present content using display 514, to communicate with one or more computing devices 450, and so on. Memory 520 can include any suitable volatile memory, non-volatile memory, storage, or any suitable combination thereof. For example, memory 520 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 520 can have encoded thereon a server program for controlling operation of server 452. In such embodiments, processor 512 can execute at least a portion of the server program to transmit information and/or content (e.g., data, images, a user interface) to one or more computing devices 450, receive information and/or content from one or more computing devices 450, receive instructions from one or more devices (e.g., a personal computer, a laptop computer, a tablet computer, a smartphone), and so on.

In some embodiments, the server 452 is configured to perform the methods described in the present disclosure. For example, the processor 512 and memory 520 can be configured to perform the methods described herein (e.g., the method of FIG. 1).

In some embodiments, data source 402 can include a processor 522, one or more data acquisition systems 524, one or more communications systems 526, and/or memory 528. In some embodiments, processor 522 can be any suitable hardware processor or combination of processors, such as a CPU, a GPU, and so on. In some embodiments, the one or more data acquisition systems 524 are generally configured to acquire data, images, or both, and can include an MM system. Additionally or alternatively, in some embodiments, the one or more data acquisition systems 524 can include any suitable hardware, firmware, and/or software for coupling to and/or controlling operations of an MRI system. In some embodiments, one or more portions of the data acquisition system(s) 524 can be removable and/or replaceable.

Note that, although not shown, data source 402 can include any suitable inputs and/or outputs. For example, data source 402 can include input devices and/or sensors that can be used to receive user input, such as a keyboard, a mouse, a touchscreen, a microphone, a trackpad, a trackball, and so on. As another example, data source 402 can include any suitable display devices, such as an LCD screen, an LED display, an OLED display, an electrophoretic display, a computer monitor, a touchscreen, a television, etc., one or more speakers, and so on.

In some embodiments, communications systems 526 can include any suitable hardware, firmware, and/or software for communicating information to computing device 450 (and, in some embodiments, over communication network 454 and/or any other suitable communication networks). For example, communications systems 526 can include one or more transceivers, one or more communication chips and/or chip sets, and so on. In a more particular example, communications systems 526 can include hardware, firmware, and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 528 can include any suitable storage device or devices that can be used to store instructions, values, data, or the like, that can be used, for example, by processor 522 to control the one or more data acquisition systems 524, and/or receive data from the one or more data acquisition systems 524; to generate images from data; present content (e.g., data, images, a user interface)

using a display; communicate with one or more computing devices 450; and so on. Memory 528 can include any suitable volatile memory, non-volatile memory, storage, or any suitable combination thereof. For example, memory 528 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 528 can have encoded thereon, or otherwise stored therein, a program for controlling operation of data source 402. In such embodiments, processor 522 can execute at least a portion of the program to generate images, transmit information and/or content (e.g., data, images, a user interface) to one or more computing devices 450, receive information and/or content from one or more computing devices 450, receive instructions from one or more devices (e.g., a personal computer, a laptop computer, a tablet computer, a smartphone, etc.), and so on.

In some embodiments, any suitable computer-readable media can be used for storing instructions for performing the functions and/or processes described herein. For example, in some embodiments, computer-readable media can be transitory or non-transitory. For example, non-transitory computer-readable media can include media such as magnetic media (e.g., hard disks, floppy disks), optical media (e.g., compact discs, digital video discs, Blu-ray discs), semiconductor media (e.g., RAM, flash memory, EPROM, EEPROM), any suitable media that is not fleeting or devoid of any semblance of permanence during transmission, and/or any suitable tangible media. As another example, transitory computer-readable media can include signals on networks, in wires, conductors, optical fibers, circuits, or any suitable media that is fleeting and devoid of any semblance of permanence during transmission, and/or any suitable intangible media.

As used herein in the context of computer implementation, unless otherwise specified or limited, the terms "component," "system," "module," "framework," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

The present disclosure has described one or more preferred embodiments, and it should be appreciated that many equivalents, alternatives, variations, and modifications, aside from those expressly stated, are possible and within the scope of the invention.

The invention claimed is:

1. A method for generating radio frequency (RF) shimming values for use with a magnetic resonance imaging system, the method comprising:
    (a) accessing RF transmit sensitivity profile data with a computer system;
    (b) generating RF shimming values with the computer system by:
        inputting the RF transmit sensitivity profile data to a non-localized efficiency shimming cost function that penalizes under-flipping based on a minimum flip angle tuning parameter; and
        optimizing the non-localized efficiency shimming cost function, generating an output as the RF shimming values, wherein the RF shimming values minimize destructive B1+ interferences within an entire imaging field-of-view; and
    (c) storing the RF shimming values for use with an MRI system.

2. The method of claim 1, wherein the non-localized efficiency shimming cost function further optimizes for maximum flip angle across modes.

3. The method of claim 1, wherein optimizing the non-localized efficiency shimming cost function includes setting at least one constraint on the non-localized efficiency shimming cost function while the non-localized efficiency shimming cost function is being optimized.

4. The method of claim 1, wherein the non-localized efficiency shimming cost function penalizes under-flipping without explicitly constraining over-flipping.

5. The method of claim 1, further comprising:
    accessing the RF shimming values with an MRI system;
    controlling the MRI system to acquire k-space data using a pulse sequence that implements the RF shimming values; and
    reconstructing an image from the k-space data.

6. The method of claim 5, wherein the pulse sequence includes a gradient-recalled echo (GRE) acquisition.

7. The method of claim 1, wherein the RF transmit sensitivity profile data comprises RF transmit sensitivity profiles for a plurality of subjects and the non-localized efficiency shimming cost function incorporates the RF transmit sensitivity profiles for a plurality of subjects to generate universal modes.

8. The method of claim 2, wherein the non-localized efficiency shimming cost function further optimizes for maximum flip angle across modes based in part on a maximum flip angle tuning parameter.

9. The method of claim 3, wherein the at least one constraint comprises a constraint for a desired efficiency in a local region-of-interest using a Rayleigh quotient.

10. The method of claim 3, wherein the at least one constraint comprises a constraint for local specific absorption rate (SAR) based on virtual observation points.

11. The method of claim 5, wherein the pulse sequence includes a spin echo acquisition.

12. The method of claim 7, wherein the non-localized efficiency shimming cost function is optimized across the plurality of subjects.

13. The method of claim 9, wherein the Rayleigh quotient is used as a starting point for performing a phase-only RF shim.

14. The method of claim 11, wherein the spin echo acquisition is a turbo spin echo (TSE) acquisition.

15. The method of claim 11, wherein the spin echo acquisition is a fast spin echo (FSE) acquisition.

16. The method of claim 12, wherein optimizing the non-localized efficiency shimming cost function across the plurality of subjects includes constructing a plurality of non-localized efficiency shimming cost functions comprises a different non-localized efficiency shimming cost function for each of the plurality of subjects, and minimizing a Euclidian norm of the plurality of non-localized efficiency shimming cost functions.

* * * * *